(12) United States Patent
Liu et al.

(10) Patent No.: US 7,245,877 B2
(45) Date of Patent: Jul. 17, 2007

(54) WIRELESS LOCAL AREA NETWORK DETECTION

(75) Inventors: Jiewen Liu, San Diego, CA (US); Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 10/639,732

(22) Filed: Aug. 12, 2003

(65) Prior Publication Data

US 2005/0037754 A1 Feb. 17, 2005

(51) Int. Cl.
*H04B 15/00* (2006.01)

(52) U.S. Cl. .................. 455/62; 455/500; 709/220; 370/311

(58) Field of Classification Search .............. 455/62, 455/500; 370/311, 329, 474; 709/220, 225
See application file for complete search history.

(56) References Cited

U.S. PATENT DOCUMENTS

| 6,834,045 B1* | 12/2004 | Lappetelainen et al. .... 370/329 |
| 2002/0188723 A1* | 12/2002 | Choi et al. .................. 709/225 |
| 2004/0090929 A1* | 5/2004 | Laux et al. ................... 370/311 |
| 2004/0093398 A1* | 5/2004 | Tang et al. .................. 709/220 |
| 2004/0127240 A1* | 7/2004 | Li .............................. 455/500 |
| 2004/0179549 A1* | 9/2004 | Ophir et al. ................ 370/474 |

FOREIGN PATENT DOCUMENTS

| EP | 1 098 477 | 5/2001 |
| WO | WO 2004/061700 | 7/2004 |

OTHER PUBLICATIONS

PCT/US2004/025218, Aug. 4, 2004, PCT Search Report—Intel Corporation.
PCT/US2004/025218, Aug. 4, 2005, Written Opinion—Intel Corporation.
IEEE 802.11d-2001 Part II Wireless Lan Medium Access Control and Physical Layer specifications. Amendment 3: Specification for Operation in Additional Regulatory Domains, ANSI/IEEE Std (Jul. 13, 2001), pp. 1-34, XP002284884.
IEEE standard Part II: wireless LAN medium access control (MAC) and physical lay (PHY) specification, (ISO/IEC 8802-11, ANSI/IEEE std. 802.11-1999), Chapter 11: MAC sublayer management entity. ISO-IEC 8802-11 ANSI/IEEE STD 802.11, XX, XX (Aug. 20, 1999), pp. 123-137, XP002207975.
IEEE standard Part II; wireless LAN medium access control (MAC) physical layer (PHY) specification. (ISO/IEC 8802-11, ANSI/IEEE Std. 802.11-1999) Annex C.3: Formal descriptions of MAC operation, state machines for MAC stations, ISO/IEC 8802-11 ANSI/IEEE STD 802.11, XX, XX (Aug. 20, 1999), pp. 324-399, XP002320689.

(Continued)

*Primary Examiner*—Joseph Feild
*Assistant Examiner*—Phuoc Doan
(74) *Attorney, Agent, or Firm*—Schwegman, Lundberg, Woessner & Kluth, P.A.

(57) ABSTRACT

Briefly, in accordance with one embodiment of the invention, a mobile unit may detect and connect to a wireless local area network, contemplating worldwide multiband networks and multiple regulatory domains, with a shorter searching time.

19 Claims, 2 Drawing Sheets

OTHER PUBLICATIONS

Figure 1:
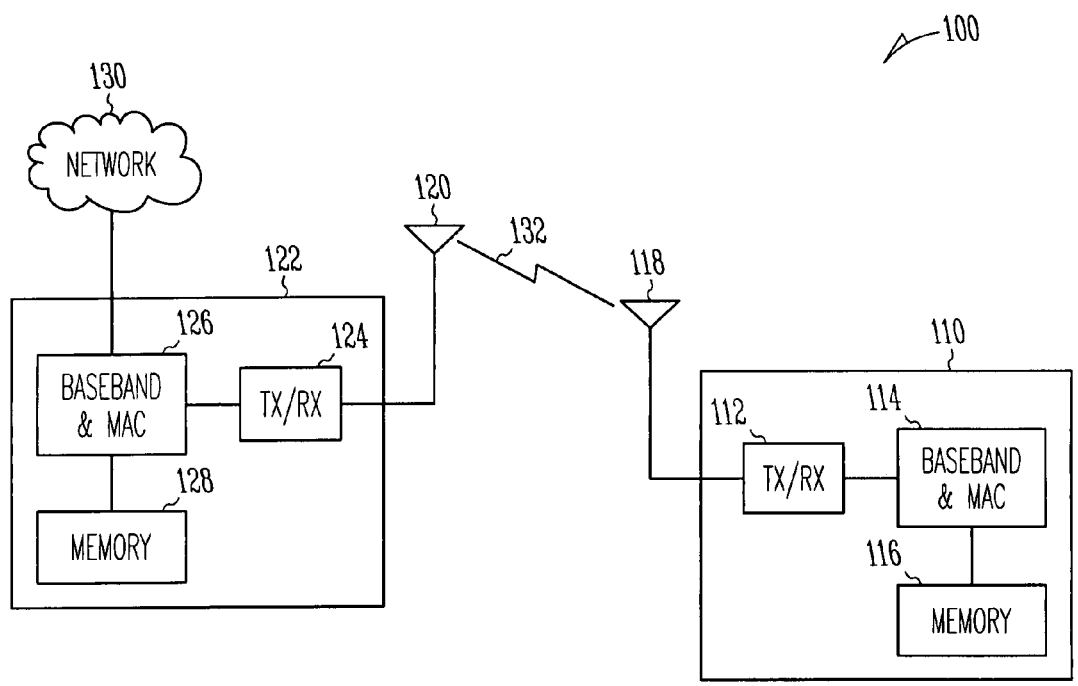

IEEE standard Part II; wireless LAN medium access control (MAC) physical layer (PHY) specification. (ISO/IEC 8802-11, ANSI/IEEE Std. 802.11-1999) Chapter 7: Frame Formats ISO/IEC 8802-11 ANSI/IEEE STD 802.11, XX, XX (Aug. 20, 1999), pp. 1, 34-58, XP002206839.

IEEE standard Part II; wireless LAN medium access control (MAC) physical layer (PHY) specification. (ISO/IEC 8802-11, ANSI/IEEE Std. 802.11-1999) Chapter 9: MACB sublayer functional description ISO/IEC 8802-11 ANSI/IEEE STD 802.11, XX, XX (Aug. 20, 1999), pp. 70-97, XP002207974.

* cited by examiner

WIRELESS LOCAL AREA NETWORK DETECTION

BACKGROUND OF THE INVENTION

The time required for network connection is one technical parameter indicating performance of a wireless system. With regulatory limitations imposed on wireless communications, a mobile unit obtains regulatory information such as valid frequency channels and transmitting power levels, typically broadcast from the network itself, before connecting to the network. If there is no regulatory information broadcast from the network, or if the mobile unit does not support the regulatory standard, the mobile unit searches available channels using a passive joining method. Such a passive joining method may require some amount of time for the mobile unit to connect to the network, thereby impacting performance of the wireless system.

DESCRIPTION OF THE DRAWING FIGURES

Figure 2:
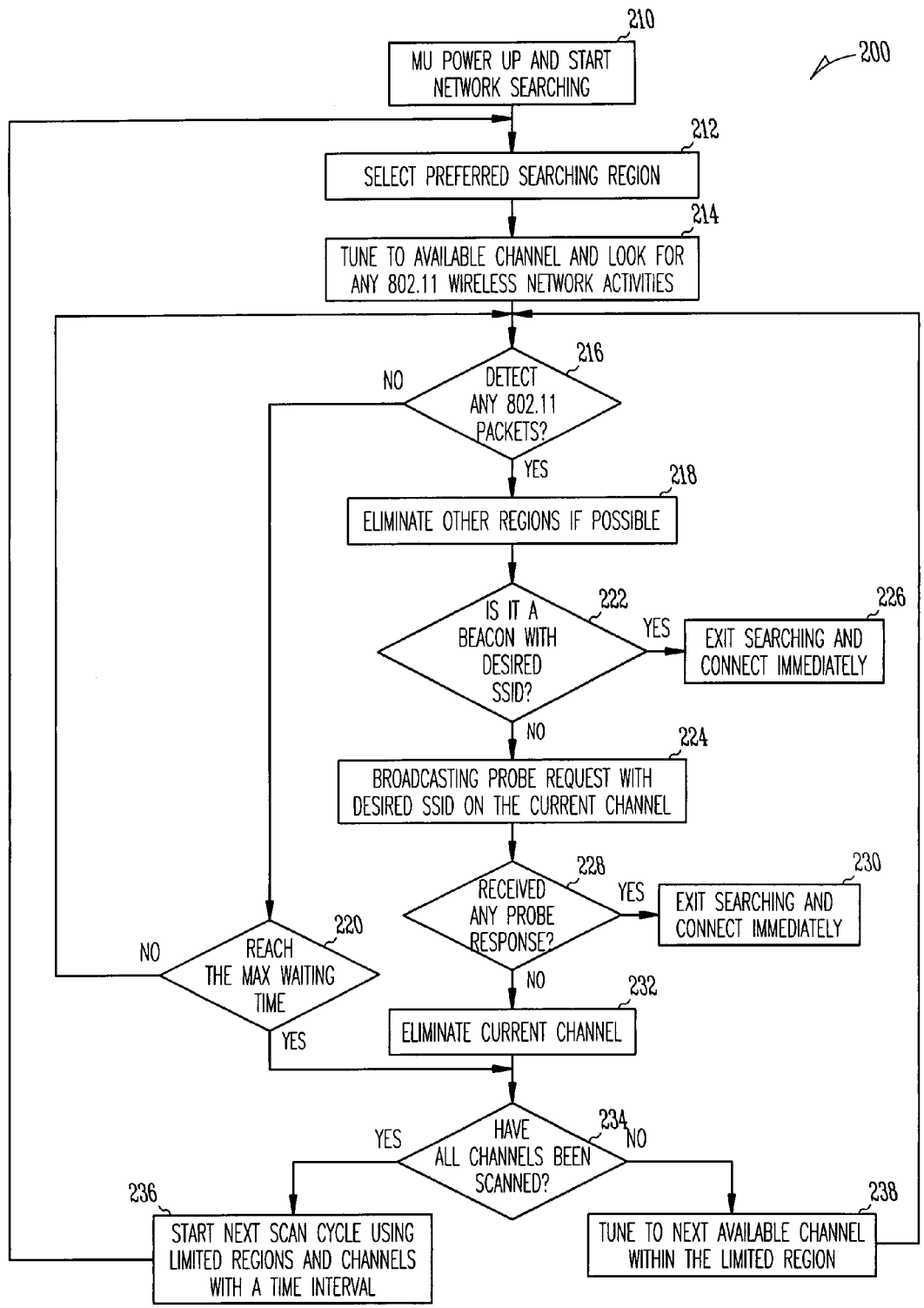

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a block diagram of a wireless local area network in accordance with one embodiment of the present invention; and FIG. 2 is a flow diagram of a method for detecting a wireless local area network in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with an Institute of Electrical and Electronics Engineers (IEEE) standard such as IEEE 802.11a, IEEE 802.11b, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Referring now to FIG. 2, a method for detecting a wireless local area network in accordance with the present invention will be discussed. The method 200 of FIG. 2 in one embodiment may be implemented by mobile unit 110 of FIG. 1 and may be, for example, tangibly embodied as instructions stored in memory 116 and executed by processor 114, although the scope of the invention is not limited in this respect. Method 200 may initiate at block 210 where mobile unit 110 may power up and start searching for an access point 122 with which to communicate, and may communicate in a manner compliant with an IEEE standard such as the IEEE 802.11a standard or the like, although the scope of the invention is not limited in this respect. In one embodiment, mobile unit 110 may be arranged to operate in one or more regulatory regions, and may start with a preferred searching region at block 212, for example the United States region, the Europe Region, the Japan region, and so on. The preferred searching region may be selected in one or more ways, for example the user may select a preferred region. Alternatively, the region in which mobile unit 110 previously operated may be the initially selected preferred region. In another alternative embodiment, the preferred region may be selected with a default setting which may be for example stored in memory 116, although the scope of the invention is not limited in this respect.

Mobile unit 110 at block 214 may then tune to an available channel in the preferred region, and may look for any IEEE 802.11 wireless network activity such as any traffic, including data packets or management packets, for one or more available channels in the preferred region, and optionally until all available channels are scanned. For each channel, a determination may be made at block 216 whether any IEEE 802.11 activity or packets are detected, and if not, a determination may be made at block 220 whether a maximum waiting time has been reached. If a maximum waiting time has been reached, method 200 may continue at block 234 which is discussed, below.

In the event IEEE 802.11 activity or packets are detected at block 216, regions that are do not operate on the current frequency may be eliminated at block 218, if possible. For example, if IEEE 802.11 activity is detected at block 216 on a United States region frequency band, then the Japan region may be eliminated since there are no mutual frequency bands in the United States region and the Japan region. A determination may be made at block 222 whether a network may be identified from the detected IEEE 802.11 activity or packets. For example, if a beacon from access point 122 is detected, mobile unit 110 may determine whether the beacon includes a desired service set identifier (SSID) which may be used, for example, to differentiate one wireless local area network from another wireless local area network. If the SSID is a desired SSID, then the searching process of method 200 may be exited, and mobile unit 100 may process association and connect with access point 122 at block 226, although the scope of the invention is not limited in this respect.

In the event a desired network is not identified at block 222, the current channel may be considered a valid channel, and a mobile unit 110 may broadcast a probe request with information indicating a desired network identification, for example an SSID. In one embodiment, the probe request may be transmitted using a safe transmission power level, although the scope of the invention is not limited in this respect. A determination may be made at block 228 whether a response is received in reply to the probe request, and if so, then the searching process of method 200 may be exited, and mobile unit 100 may process association and connect with access point 122 at block 230, although the scope of the invention is not limited in this respect. If no reply to the probe request is received, then the current channel may be eliminated at block 232 for a predetermined time period, allowing for rescanning of the current channel after the predetermined time period to allow for a case in which the network environment may change. In an alternative embodiment, two or more probe requests may be transmitted prior to elimination of the current channel at block 232, although the scope of the invention is not limited in this respect.

A determination may be made at step 234 whether all channels have been scanned in a current, non-eliminated region. In the event not all channels have been scanned, mobile unit 110 may tune to another channel within a non-eliminated region at block 238, and method 200 may continue at block 216 on the next tuned channel. In the event all channels have been scanned, another scan cycle may be started at block 236 within the limited, or valid, regions, using a predetermined time interval, and method 200 may continue accordingly at block 216. In one embodiment, complete network activity information might not be determined via method 200 since the searching process may exit in the middle of the scanning. However it may be provided to a host of mobile unit 110, for example the operating system of mobile unit 110, once mobile unit 110 completes association with access point 122 through a complete network scanning for all channels although the scope of the invention is not limited in this respect.

Although the invention has been described with a certain degree of particularity, it should be recognized that elements thereof may be altered by persons skilled in the art without departing from the spirit and scope of the invention. It is believed that the wireless local area network detection of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
   from two or more regulatory regions in which a mobile unit may operate, selecting one of the two or more regulatory regions in which to perform a passive scan for a wireless local area network;
   performing a passive scan on one or more channels;
   if network activity is detected on a current channel of said one or more channels, eliminating regulatory regions that do not operate on a current frequency and determining whether the network activity is on a preferred network;
   if the network activity is on a preferred network, exiting said performing and connecting to the network;
   if the network activity is not on a preferred network, indicating the channel as a valid channel of a present region;
      in said performing, sending a probe request with a preferred network identifier on the current channel using a safe transmitting power level; and
      if a reply to the probe request is received, exiting said performing and connecting to the network; and
      if no reply to the probe request is received, eliminating the current channel.

2. A method as claimed in claim 1, wherein the regulatory region selected in said selecting is selected by a user of the mobile unit.

3. A method as claimed in claim 1, wherein the regulatory region selected in said selecting is a regulatory region in which the mobile unit was last operated.

4. A method as claimed in claim 1, wherein the regulatory region selected in said selecting is stored in a memory of said mobile unit.

5. A method as claimed in claim 1, if network activity is detected in said performing, eliminating one or more of the two or more regulatory regions based on a channel of said performing.

6. A method as claimed in claim 1, wherein said eliminating includes eliminating a regulatory region in which a channel on which the network activity is detected is not allowed.

7. A method, comprising:
   performing a passive scan on one or more channels;
   if network activity is detected on a current channel of said one or more channels, eliminating regulatory regions that do not operate on a current frequency and determining whether the network activity is on a preferred network;
   if the network activity is on a preferred network, exiting said performing and connecting to the network;
   if the network activity is not on a preferred network, indicating the channel as a valid channel of a present region;
      in said performing, sending a probe request with a preferred network identifier on the current channel using a safe transmitting power level; and
      if a reply to the probe request is received, exiting said performing and connecting to the network; and
      if no reply to the probe request is received, eliminating the current channel.

8. A method as claimed in claim 7, further comprising continuing the method with said performing on another of said one or more channels if no reply to the probe request is received.

9. An apparatus for detecting a wireless local area network, comprising: a transceiver; and a baseband processor coupled to said transceiver, wherein said baseband processor performing a passive scan on one or more channels;
   if network activity is detected on a current channel of said one or more channels, eliminating regulatory regions that do not operate on a current frequency and determining whether the network activity is on a preferred network;
   if the network activity is on a preferred network, exiting said performing and connecting to the network;
   if the network activity is not on a preferred network, indicating the channel as a valid channel of a present region;
      in said performing, sending a probe request with a preferred network identifier on the current channel using a safe transmitting power level; and
      if a reply to the probe request is received, exiting said performing and connecting to the network; and
      if no reply to the probe request is received, eliminating the current channel.

10. An article as claimed in claim 9, wherein the instructions, when executed, result in detecting a wireless local area network by selecting one regulatory domain from two or more regulatory regions in which a mobile unit may operate in which to perform a passive scan for the wireless local area network.

11. An article as claimed in claim 10, wherein the instructions, when executed, further result in detecting a wireless local area network by a user of the mobile unit selecting the regulatory region selected in said selecting.

12. An article as claimed in claim 10, wherein the instructions, when executed, further result in detecting a wireless local area network by selecting the regulatory region in which the mobile unit was last operated in said selecting.

13. An article as claimed in claim 10, wherein the instructions, when executed, further result in detecting a wireless local area network by selecting a regulatory region stored in a memory of said mobile unit in said selecting.

14. An article as claimed in claim 9, wherein the instructions, when executed, further result in detecting a wireless local area network by eliminating a regulatory region in which a channel on which the network activity is detected is not allowed.

15. An article as claimed in claim 9, wherein the instructions, when executed, further result in detecting a wireless local area network by continuing the method with said performing on another of said one or more channels if no reply to the probe request is received.

16. An apparatus, comprising:
a transceiver;
an omnidirectional antenna to couple to said transceiver; and
a baseband processor to couple to said transceiver, wherein said baseband processor detects a wireless local area network by selecting one regulatory domain from two or more regulatory regions in which to perform a passive scan for the wireless local area network;
wherein said baseband processor further detects a wireless local area network by:
performing a passive scan on one or more channels;
if network activity is detected on a current channel of said one or more channels, determining whether the network activity is on a preferred network;
if the network activity is on a preferred network, exiting said performing and connecting to the network;
if the network activity is not on a preferred network,
indicating the channel as a valid channel of a present region;
in said performing, sending a probe request with a preferred network identifier on the current channel using a safe transmitting power level; and
if a reply to the probe request is received, exiting said performing and connecting to the network; and
if no reply to the probe request is received, eliminating the current channel.

17. An apparatus as claimed in claim 16, wherein the regulatory region selected in said selecting is selected by a user of the mobile unit.

18. An apparatus as claimed in claim 16, wherein the regulatory region selected in said selecting is a regulatory region in which the mobile unit was last operated.

19. An apparatus as claimed in claim 16, wherein the regulatory region selected in said selecting is stored in a memory of said mobile unit.

\* \* \* \* \*